June 23, 1942.  H. W. KOST  2,287,180
FASTENER
Filed Sept. 19, 1938
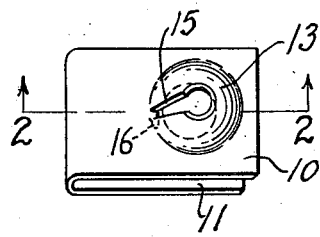
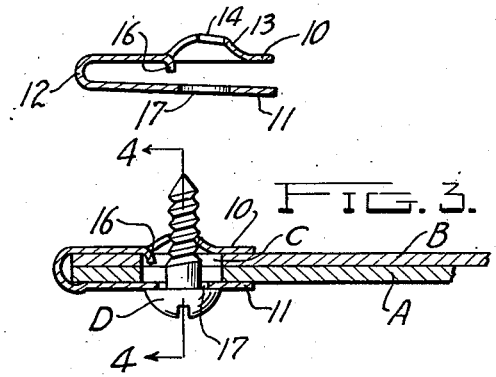
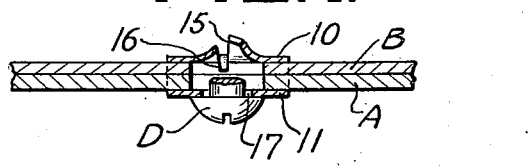
Inventor
Harold W. Kost
By Malcolm W. Fraser
Attorney Patented June 23, 1942

2,287,180

UNITED STATES PATENT OFFICE 2,287,180

FASTENER

Harold W. Kost, Ferndale, Mich., assignor, by mesne assignments, to Detroit Harvester Company, Detroit, Mich., a corporation of Michigan Application September 19, 1938, Serial No. 230,563

7 Claims. (Cl. 85—36)

This invention relates to fastening devices of sheet material in which a portion of the sheet material is outwardly deformed for threadedly engaging the shank of a screw threaded member, and an object is to provide a fastener of this character with new improved means for holding or centering the same in position and militating against displacement, thereby to facilitate the connecting together of parts, such, for example, as certain parts of an automobile which are not readily visible or accessible and are consequently troublesome to join.

Other objects and advantages will hereinafter appear and for purposes of illustration, but not of limitation, an embodiment of the invention is shown on the accompanying drawing, in which Figure 1 is a perspective view of a fastener;

Figure 2 is a sectional elevation on the line 2—2 of Figure 1;

Figure 3 is a longitudinal sectional elevation of the fastener applied to a structure to be joined; and Figure 4 is a transverse sectional view substantially on the line 4—4 of Figure 3, a portion of the screw being broken away.

The illustrated embodiment of the invention comprises a fastener consisting of a relatively thin strip of sheet material, such as sheet metal, folded upon itself to provide arms 10 and 11 which are substantially parallel to each other and joined by an integral connecting wall 12. The arms 10 and 11 are spaced from each other an amount corresponding to the thickness of the structure to be joined, as illustrated in Figures 3 and 4, made up of the panels A and B, so that the fastener may be slightly spread apart and slipped over an end or other portion of the structure. Formed in the arm 10 near the free edge thereof is an outwardly pressed frusto-conical protuberance 13, apertured at 14, the wall of the aperture being helical in order to engage the thread of a screw-threaded shank of a bolt or screw. The formation of the protuberance from a general aspect forms no part of this invention and more detailed description thereof is not considered necessary. Reference is hereby made to the patent to Bion C. Place, No. 2,081,065, wherein the structure is fully described. In forming such a protuberance, the wall of the protuberance is slit as indicated at 15. In this instance, a portion of the wall of the protuberance in the region of the slit 15 is cut to provide a tongue 16 which is bent inwardly toward the arm 11. As shown, the tongue 16 inclines slightly toward the free ends of the arms. The tongue 16 extends into the registering openings C formed in the panels A and B with which the protuberance 13 is adapted to register, the tongue engaging an edge portion of the opening thereby militating against displacement of the fastener and operating automatically to center the protuberance relative to the opening C. The arm 11 of the fastener is formed with an opening 17 substantially in alignment with the protuberance 13 and somewhat larger than the thread engaging opening 14 to allow the shank of a screw D to pass freely therethrough.

In use, it will be apparent that the arms 10 and 11 are slightly spread apart and slipped over the panels A and B of the structure to be joined until the tongue 16 enters the registering openings C whereupon the protuberance 13 and the opening 17 are properly aligned relative to the openings C. When the fastener is in this position, it is apparent that the screw D can be readily applied being first inserted through the opening 17 and then into screw-threaded engagement with the protuberance 13.

It is to be understood that numerous changes in details of construction, arrangement and operation may be effected without departing from the spirit of the invention especially as defined in the appended claims.

What I claim is:

1. A fastener for securing a structure provided with a hole through which a screw or the like extends, comprising a unitary substantially C-shaped strip of sheet material having the arms thereof disposed in superposed relation, a thread engaging portion formed in one arm, and a tongue struck out of the material in the region of said thread-engaging portion, said tongue being adapted to enter the hole in the structure thereby to hold the fastener against displacement.

2. A fastener for securing a structure provided with a hole through which a screw or the like extends, comprising a unitary substantially C-shaped strip of sheet material having the arms thereof disposed in superposed relation, one arm being apertured to enable the shank of a threaded connecting member to pass therethrough, a thread engaging portion pressed out of the other arm substantially in alignment with the aperture in the first arm, and a tongue struck out of the material in the region of said thread engaging portion and projecting toward the other arm for entering the hole in the structure for retaining the fastener approximately in position.

3. A fastener comprising a unitary strip of sheet material provided with a deformed protuberance for engaging a threaded shank, and a tongue struck out of the sheet material forming the protuberance and disposed in a direction opposite to the protuberance for extending into a shank-receiving opening of a part to be joined beneath the shank-engaging protuberance for preventing displacement of the fastener.

4. A fastener comprising a unitary strip of sheet material provided with a deformed protuberance for engaging a threaded shank, and a tongue struck out of a wall of the protuberance and extending inwardly therefrom, said tongue being adapted to extend into a shank receiving opening of a part to be joined beneath the shank-engaging protuberance for holding the fastener against displacement.

5. A fastener comprising a unitary strip of sheet material provided with an outwardly extending cone shaped protuberance formed to engage threadedly the shank of a screw threaded member, and a tongue struck out of a side of the cone and extending in an opposite direction to enter the opening for the screw member in a part to be joined, thereby to hold the fastener against displacement.

6. A fastener for securing a structure provided with a hole through which a screw or the like extends, comprising a unitary substantially C-shaped strip of sheet material having the arms thereof disposed in superposed relation, one arm being apertured to receive the shank of a threaded connecting member, a conical outwardly extending protuberance on the other arm deformed to engage threadedly the connecting member, and a tongue extending inwardly from said protuberance for entrance into a hole in said structure for militating against displacement of the fastener, the tongue extending into the same opening which receives the connecting member.

7. A fastener for a panel formed with a hole through which a screw or the like extends, comprising a sheet metal piece, a shank-engaging portion formed in said piece adapted to align with the hole, and a projection on the sheet metal in the region of said shank-engaging portion to enter the hole in the panel therebeneath through which the shank extends for engagement with said shank-engaging portion, whereby the projection holds the fastener against displacement laterally with respect to the hole.

HAROLD W. KOST.